United States Patent [19]
Minich, Jr. et al.

[11] 3,827,532
[45] Aug. 6, 1974

[54] COLLAPSIBLE OVERHEAD GUARD

[76] Inventors: Paul R. Minich, Jr.; Thorkild Jensen, both of 6400 Goldsboro Rd., Bethesda, Md. 20036

[22] Filed: May 18, 1973

[21] Appl. No.: 361,609

[52] U.S. Cl.............. 187/9, 214/DIG. 7, 296/107
[51] Int. Cl............... B60j 7/00, B60r 21/02
[58] Field of Search........ 187/9; 214/513, 620, 621, 214/660, 670–674, DIG. 7; 280/150 C; 296/102, 107; 182/112

[56] References Cited
UNITED STATES PATENTS

| | | | |
|---|---|---|---|
| 3,336,074 | 8/1967 | Barnes et al. | 296/102 |
| 3,472,550 | 10/1969 | Marco | 296/102 |
| 3,638,758 | 2/1972 | Weisker | 182/112 |
| 3,656,779 | 4/1972 | Ciungan | 296/102 X |
| 3,713,688 | 1/1973 | Monroe | 280/150 C X |

Primary Examiner—Evon C. Blunk
Assistant Examiner—James L. Rowland
Attorney, Agent, or Firm—Littlepage, Quaintance, Murphy & Dobyns

[57] ABSTRACT

Industrial vehicle overhead guard providing operator protection over a range of vertical positions may be opened to allow for necessary movement of the vehicle operator.

5 Claims, 5 Drawing Figures

COLLAPSIBLE OVERHEAD GUARD

BACKGROUND OF THE INVENTION

1. Field of the Invention

A principal hazard of warehousing systems is the injury to personnel resulting from the falling of stored materials and the impact with low overhead clearances. Overhead guards which are positioned above the operators of material-handling equipment provide protection against such accidents. Safety codes and plant operating regulations often require such overhead guards. This invention relates to an overhead guard for an industrial vehicle which can be retracted to a reduced overall height to allow the vehicle to operate in minimum overhead clearance areas and can be additionally opened to provide greater freedom for the operator.

2. Description of Prior Art

In conventional material handling equipment where the operator rides on an operator's platform at a fixed height relative to the floor, it is usually desirable for the operator to stand to perform some operations and yet sit while performing other functions. Any fixed overhead guard must therefore be of such a height as to afford protection to the operator while standing. Any fixed guard of such a height might well be too great for the minimum overall height clearance in a particular warehousing situation. This would be particularly true if the material handling lift was to go inside the body of a conventional over-the-road truck.

A retractable overhead guard for such a lift truck is disclosed in U.S. Pat. No. 3,259,211.

In material handling equipment where an operator rides on an operator's platform rigidly connected to the carriage which moves vertically along a mast, it is likewise desirable that the operator be able to stand to perform certain operations. When a guard is provided over an operator's platform with sufficient room for the operator to stand, the guard often prevents the positioning of the carriage near overhead structures of the warehousing building. Such prevention of maximum upward positioning results in an economic loss of warehousing space which is available for storage. If the overhead guard is designed to be so short as to accommodate only a sitting operator, more of the available warehousing space can be used for storage, since loads can be lifted and stored higher. However, with such a short overhead guard, the operator is unable to stand, which may be necessary to conveniently guide and maneuver the material handling vehicle from aisle to aisle or in other areas throughout the warehouse. An overhead guard which is hinged for lowering on such a lift vehicle is disclosed in U.S. Pat. No. 3,638,758.

A common disadvantage presented by the removable overhead guards of the prior art is the loss of protection afforded the operator when the guard is moved to its "open" position. It is desirable that the protection given the operator remains substantially unchanged when the guard is lowered to reduce the overall height clearance required. Typical safety codes and plant operating regulations would be more nearly satisfied if such were the case.

SUMMARY OF THE INVENTION

The present invention accomplishes the use of industrial lift truck in minimum overhead clearance areas by providing a guard which is fully operable in either a raised position, suitable to protect a standing operator, or a lowered position, suitable to protect a sitting operator from overhead hazards. The overhead guard can be opened by the lift operator when necessary to allow the operator to move about the material handling equipment.

In a preferred embodiment of the invention, an interlock is provided between the overhead guard and the main vehicle power unit to prevent any change of position of the lift apparatus while the guard is in the open position.

In a preferred form of the invention used with stackers which have an operator's platform mounted on a carriage which is movable vertically along a mast, safety interlock switches of a well-known commercially available type are provided to permit maximum upward extension of the carriage only when the guard is lowered, thus preventing damage to the overhead guard mechanism.

One feature of the invention is the provision of an overhead guard for material handling equipment which is movable between an operative raised position and an operative lowered position.

An advantage of the invention is the provision for the opening of the overhead guard to provide greater freedom of movement for the operator.

Another feature of the invention is the provision of counter-balancing means permitting easy opening and closing of the overhead guard.

An additional advantage of the invention is the provision of synchronizing means preventing the overhead guard from binding in either the raised or lowered positions.

The foregoing and other features and advantages of the invention will become apparent from the following description, drawings and claims.

DETAILED DESCRIPTION OF THE DRAWINGS

Figure 1:
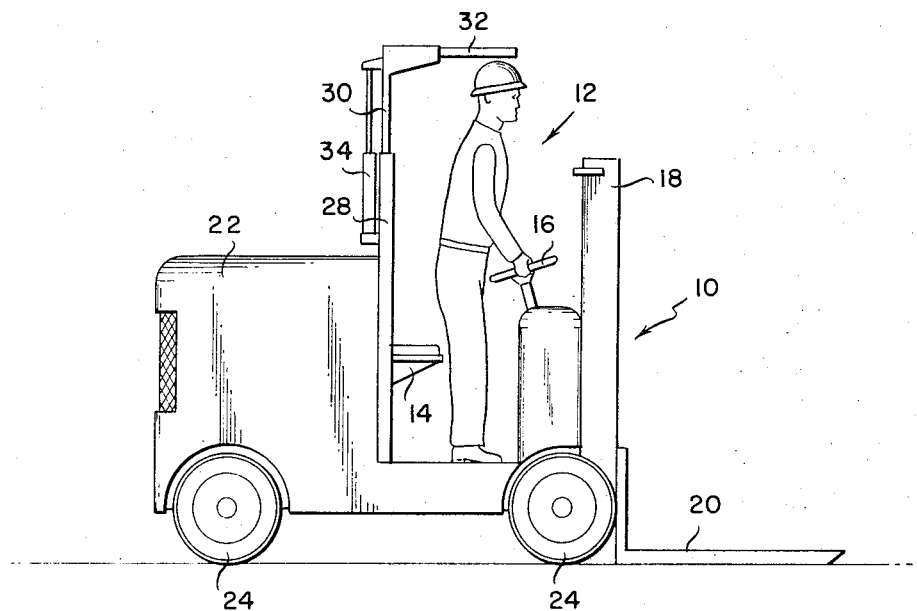
FIG. 1 is a schematic representation of a conventional warehousing lift truck having a stationary operator's position with a collapsible overhead guard in a raised yet closed position.

Referring to FIG. 1, a conventional warehousing lift truck 10 is shown having an operator's position 12 including a seat 14 and a steering wheel 16. The lift truck has an extensible mast 18 and carriage 20 at its forward end and power means not shown within an engine enclosure 22 at its rearward end. The lift truck is supported on wheels 24 which permit the vehicle to move about as desired.

Adjacent the operator's position is a collapsible overhead guard 26 comprising a vertical support 28 fixed to the lift truck, a movable support 30, vertically movable in relation to the vertical support 28, and shown in the extreme upward or raised position thereby permitting sufficient room for the operator to stand. A guard element 32 extends horizontally over the head of the operator to provide the desired protection from hazards. Motor means 34 is provided for moving the movable support between the raised and lowered positions.

Figure 2:
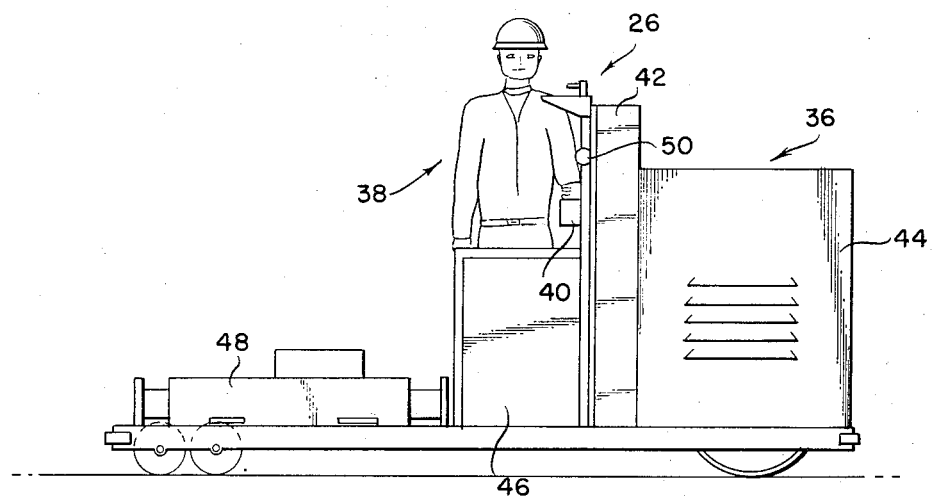
FIG. 2 is a schematic representation of a warehousing lift vehicle having a carriage-mounted operator's position with a collapsible overhead guard in a lowered yet open position.

FIG. 2 depicts a warehousing lift vehicle 36 with a carriage-mounted operator's position 38 including the appropriate controls 40. The lift vehicle has an extensible mast 42 and power means not shown within an engine enclosure 44 at the rear of the vehicle. Mounted on the extensible mast is a carriage 46 with a double side-shifting fork mechanism 48 and operator's position 38 mounted thereon. Adjacent the operator's position is a collapsible overhead guard 26 with an alternate motor means 50 shown in its lowered yet open position thereby permitting the necessary freedom of movement for the operator in the appropriate situation.

In either embodiment, an operator's seat such as seat 14 can be biased to an upward position and provided with a switch connected to either motor means 34 or motor means 50, such that if the seat is depressed, the overhead guard will be in the lowered position, and when released the guard will automatically move to the raised position; thus, preventing the operator from suffering injury due to impact of his head with the guard.

Figure 3:
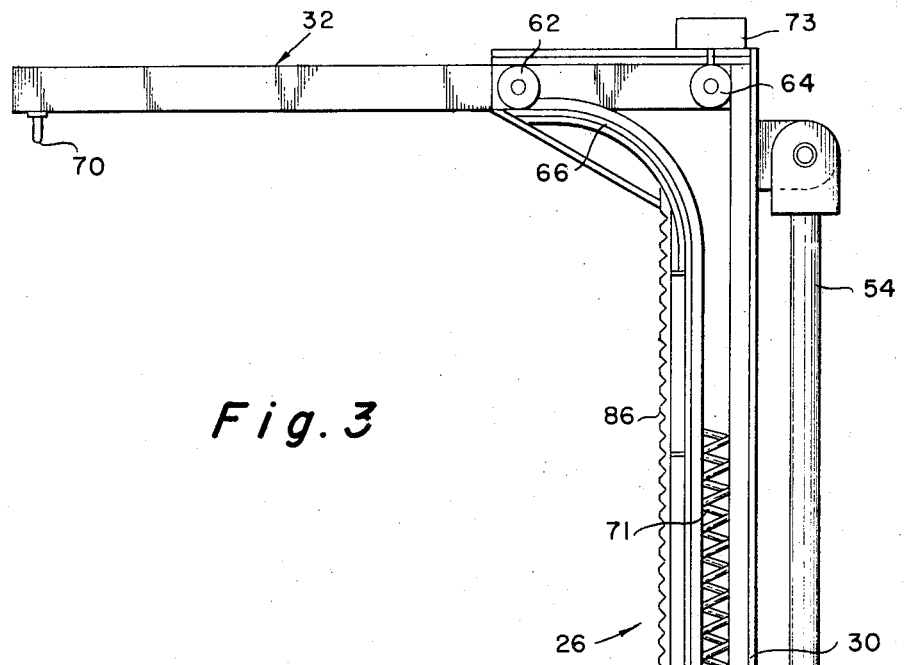
FIG. 3 is a partial sectional detail of a collapsible overhead guard and preferred motor means shown in the raised yet closed position.

Referring to FIG. 3, a collapsible overhead guard 26 comprises a vertical support 28 which would usually be advantageously fixed to an industrial vehicle adjacent an operator's position. A movable support 30 is telescopically supported within the vertical support and is moved between the extreme upward or raised position shown to any lower position by motor means 34.

A preferred motor means is a conventional hydraulic cylinder 52 attached to a vertical support 28 and hydraulic piston and rod 54 attached to the movable support 30, as shown in FIG. 3. The motor means is controlled primarily by the operator's controls and powered via hydraulic conduits 56 by the lift vehicle power source. The upward and downward position can be indicated and controlled by upper and lower limit switches 58 and 60 respectively. The limit switches are of a well-known commerically available type and commonly used in material-handling devices.

The collapsible overhead guard further comprises a guard element 32 which in the closed position shown in FIG. 3 extends horizontally from the movable support 30 over the head of the warehousing vehicle operator. The guard element is pivotably and slidably mounted in the movable support by means of a front roller 62 and a back roller 64 riding in an outside track 66 and an inside track 68, respectively. The guard element 32 has a handle 70 advantageously placed to permit easy opening and closing of the guard element by the operator. The guard element can be biased toward the closed position by biasing means 71 to further ease the closing thereof. The overhead guard can also have a means for indicating the full closed position of the guard element such as switch 73 responsive to the roller 64.

Figure 4:
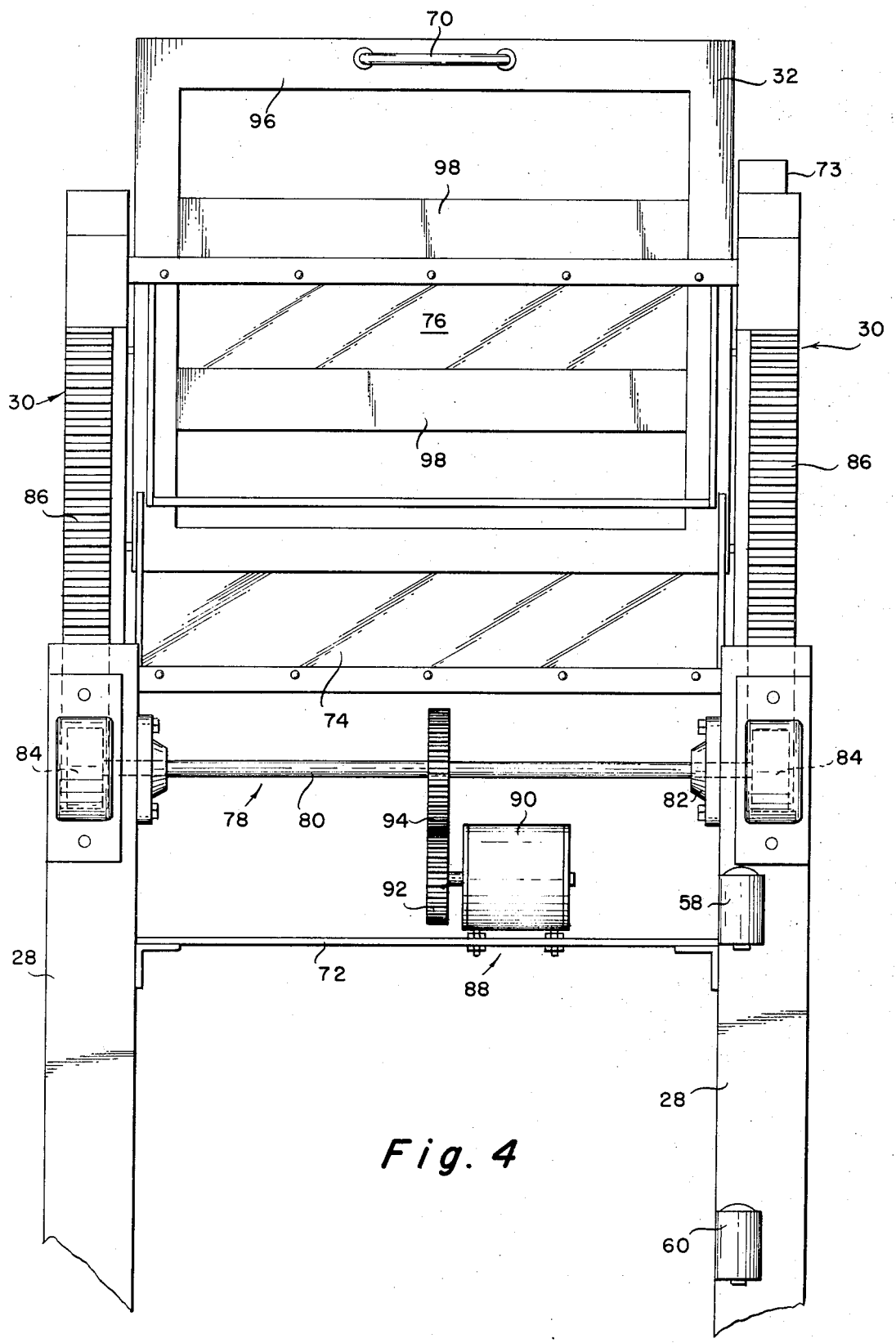
FIG. 4 is a front planar view of a collapsible overhead guard with an alternate motor means shown in the raised and open position.

FIG. 4 depicts a collapsible overhead guard viewed from the operator's position. A pair of horizontally spaced vertical supports 28 support an alternate motor mount 72 and a lower windshield 74. An upper windshield 76 is supported by a pair of horizontally spaced movable supports 30. The upper and lower windshield are preferably of a highly break resistant yet transparent material, such as Plexiglas (a registered trademark of Rohm and Hass Co.) To prevent the binding of the movable supports 30 as they move relative to the vertical supports 28, a synchronizing means 78 is provided thereby assuring equal and even vertical relative movement of the movable supports.

The synchronizing means preferably comprises a synchronizing shaft 80, supported on the vertical supports 28 by bearings 82, with pinion gears 84 mounted on the ends of shaft 80 and engaged with gear racks 86 fixed to the movable supports 30. The synchronizing means permits only equal parallel movement of the movable supports 30 relative to the vertical supports 28.

An alternate motor means 88 for moving the movable supports relative to the vertical supports is shown in FIG. 4. The motor means 88 comprises an electric motor with internal brake 90 mounted on motor mount 72. A gear 92 fixed to the shaft of the motor engages gear 94 fixed to the synchronizing shaft 80. The motor 90, controlled primarily by the operator's controls and powered by the lift vehicle power source, operates to move the movable supports between the extreme raised and lowered positions by applying appropriate power to the rack and pinion arrangement previously discussed. The application of power can be additionally limited or directed by the upper and lower limit switches 58 and 60.

The guard element 32, shown in FIG. 4 in the open position, has attached thereto a handle 70 for easy opening and closing of the guard element by the lift operator. The guard element comprises a generally rectangular frame 96 with number of protective bars 98 fixed within the frame.

Figure 5:
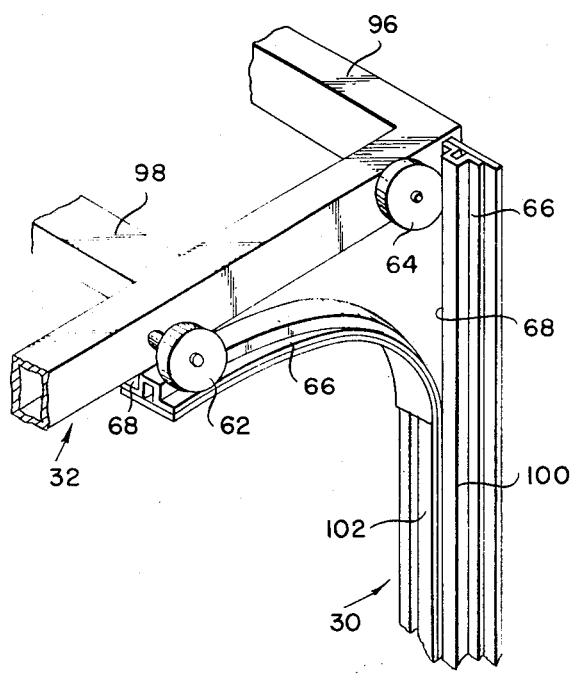
FIG. 5 is a perspective detail of the guard element roller suspension within the movable support.

As shown in FIG. 5, the movable support 30 comprises a pair of opposed guides 100 and 102. Each guide contributes to forming the inside track 68 and the outside track 66 by presenting back-to-back L-shaped sections in an opposed fashion. The guard element 32 is supported in the tracks by rollers 62 and 64 attached to the rectangular frame 96.

The switch 73, which is activated only upon the full horizontal closing of the guard element 32 by contact with roller 64, can be operatively connected to the main vehicle power unit to prevent any change of position of the lift apparatus, while the guard is in the open position. The lower limit switch 60, which is activated only upon the full lowering of the overhead guard, can additionally be operatively connected to the main vehicle power unit to permit maximum upward extension of the carriage only when the guard is lowered.

That which is claimed is:

1. In an industrial vehicle operable by an operator positioned thereon, an overhead guard comprising a pair of horizontally spaced vertical supports fixed to the vehicle, a pair of horizontally spaced movable supports telescopically supported within and vertically movable relative to said vertical supports between a raised position sufficient to allow the operator to stand and a lowered position for reducing the overall height of the vehicle, synchronizing means connected between said spaced vertical supports and engaging said spaced movable supports for assuring equal and even vertical relative movement of the movable supports, and guard means movably connected to the movable support means for vertical movement therewith and for movement relative thereto between a closed position extending over the operator and a retracted, open position.

2. In an industrial vehicle operable by an operator positioned thereon, an overhead guard comprising vertical support means fixed to the vehicle, movable support means including a track vertically movable relative to and supported by said vertical support means between a raised position sufficient to allow the operator to stand and a lowered position for reducing the overall height of the vehicle, and guard means including rollers movable on said track for movably supporting the guard means on the movable support means for vertical movement therewith and for movement relative thereto between a closed position extending over the operator and a retracted open position.

3. A collapsible overhead guard on an industrial lift vehicle operated by an greater riding in an operator's position thereon comprising a pair of horizontally spaced vertical support means advantageously fixed to the lift vehicle adjacent to the operator's position and extending upward therefrom, a pair of horizontally spaced movable support means comprising tracks telescopically supported within and movable relative to the vertical support means between a raised position sufficient to allow the operator to stand and a lower position for reducing the overall height of the vehicle, motor means for moving the movable support means between the raised and lowered positions, synchronizing means connected between said spaced vertical support means and engaging said spaced movable support means for assuring the equal parallel relative movement thereof, and guard means comprising a generally rectangular frame with a plurality of protective bars fixed within the frame and rollers fixed to the frame and movably supported within said tracks for movably supporting the guard means on the movable support for vertical movement therewith and for movement relative thereto between a substantially horizontal closed position and a substantially vertical open position.

4. An apparatus according to claim 3 further comprising switch means activated only upon the full horizontal closing of the guard means for preventing any change of position of the lift apparatus while the guard means is in the open position.

5. An apparatus according to claim 3 further comprising counterbalancing means for permitting easy opening and closing of said guard means.

* * * * *